(12) United States Patent
Gradischnig et al.

(10) Patent No.: US 6,970,550 B1
(45) Date of Patent: Nov. 29, 2005

(54) METHOD FOR CONTROLLING SERVERS

(75) Inventors: Klaus David Gradischnig, Reston, VA (US); Stefan Unger, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 519 days.

(21) Appl. No.: 10/130,703

(22) PCT Filed: Nov. 22, 2000

(86) PCT No.: PCT/EP00/11634

§ 371 (c)(1),
(2), (4) Date: Oct. 7, 2002

(87) PCT Pub. No.: WO01/39459

PCT Pub. Date: May 31, 2001

(30) Foreign Application Priority Data

Nov. 22, 1999 (DE) ................................ 199 56 081

(51) Int. Cl.[7] ............................................. H04Q 3/00

(52) U.S. Cl. .................................. 379/219; 379/221.08
(58) Field of Search .......................... 379/219, 220.01, 379/221.02, 221.08, 221.09, 221.12, 221.13, 379/207.02, 201.01, 229, 230, 244

(56) References Cited

U.S. PATENT DOCUMENTS 5,923,744 A * 7/1999 Cheng .................... 379/221.09
5,963,630 A * 10/1999 Dabbs et al. ........... 379/201.01
6,028,924 A * 2/2000 Ram et al. ................... 379/229
2002/0154756 A1 * 10/2002 Jellema et al.

\* cited by examiner

*Primary Examiner*—William J. Deane, Jr.
(74) *Attorney, Agent, or Firm*—Morrison & Foerster LLP

(57) ABSTRACT

There may be applications where for IN-calls, one SCP begins processing a transaction for supporting a service but another SCP continues processing said transaction. The invention shows how such a continuation of processing can be carried out in cases where this can be solved in terms of protocol.

7 Claims, 2 Drawing Sheets

METHOD FOR CONTROLLING SERVERS

CLAIM FOR PRIORITY

This application claims priority to International Application No. PCT/EP00/11634 which was published in the German language on May 31, 2001.

TECHNICAL FIELD OF THE INVENTION

The invention relates to a method of controlling services in a communications network.

BACKGROUND OF THE INVENTION

A characteristic of so-called intelligent networks (see the Q.1200 series of ITU-T Recommendations) is a distributed architecture (see, for example Q.1214) in which a so-called service switching function (SSF) is "controlled" by a so-called service control function (SCF). The two functions are normally (but not necessarily) provided in different physical nodes (the so-called service control point, SCP and the service switching point, SSP). The so-called INAP (Intelligent Network Application Part) protocol, which is based on TC (Transaction Capabilities, see Q.77x), SCCP (Q.71x) MTP (Q.70x) is used for communication in this case.

Applications presently exist in which an SCP starts processing of a transaction, but completes the processing in another SCP. This is described below.

In conventional applications, the standards do not provide any solution for a continuation of transaction processing. Rather, a so-called transfer is feasible, in which the message opening the transaction is passed on to the next SCP after initial treatment. In this case, the logical sender of the message is not changed. Hence, for the next SCP, it appears as if the message had arrived directly from an SSP. The SCP can then respond directly to the SSP, so that any further messages for the transaction can be interchanged directly between the SSP and the new SCP.

However, if it is necessary for the first SCP to interchange further messages with the SSP, then the transfer is no longer possible. One situation in which a further message interchange is necessary is that where the first message did not at that stage contain sufficient address information (for example dialed digits) in order to define the second SCP responsible for the further processing.

Since, with the first return message which it receives for the transaction, the SSP stores the address of the message sender, including the identification used by the sender for that transaction, and uses the information for all future messages to be transmitted for this transaction, the SSP will send all further messages to the first SCP even if the latter has in the meantime transferred the processing to the second SCP.

Thus, in this case, the first SCP is still included in the communication between the SSP and the second SCP. This is because, instead of a transfer, the first SCP must open its own transaction with the second SCP and must remain as a communication distributor in the dialog between the SSP and the second SCP. For this purpose, the first SCP must process the messages to be interchanged between the second SCP and the SSP such that it replaces the addresses and the transaction identification of the second and first SCPs for messages which are sent from the second SCP to the first SCP, by those for the transaction between the first SCP and the SSP, and passes on the amended messages to the SSP.

Conversely, messages from the SSP are processed in the first SCP such that the addresses and transaction identifications of the SSP and first SCP are replaced by those applicable to the transaction between the first SCP and the second SCP, and the amended messages are passed on to the second SCP. This is referred to as an application relay, which is carried out by the first SCP.

As can be seen immediately, this solution has the disadvantage that, even though it does not have to carry out any additional tasks for the transaction or transactions, other than the relaying process, the first SCP is still included in the communication process and, except for the TC protocol level, has to analyze and amend the messages. This wastes not only time but also processor and memory resources.

SUMMARY OF THE INVENTION

In one embodiment of the invention, there is a method for controlling services in a communications network. The method includes, for example, communicating with a first server initiated by a network node in the communications network to assist processing of a service, ending the communication by the first server when the first server and the network node have gathered information which is required for selection of a second server, the second server assisting in processing of the service, and which can be transmitted by using a single message to one of the servers, and instructing the network node to start a second communication with the first server to assist the processing of the service, with the information required for selection of the second server packed into the first message in the second communication, wherein the first message is processed by the first server, and information relating to acceptance of the second communication is passed to the second server, and the second communication is continued by the second server.

In another aspect of the invention, the first communication is ended by the first server, additional information is passed to the network node and is mirrored in the second communication to the first server.

In another aspect of the invention, the first communication is ended by the first server, information is passed to the network node, and the second communication is set up directly to the second server.

In yet another aspect of the invention, the communication between the network nodes and the servers is carried out using an INAP protocol.

DETAILED DESCRIPTION OF THE PREFERRED EMBODIMENTS

According to the invention, the disadvantages associated with the conventional art are avoided. In one embodiment of the invention, once the communication has taken place with the SSP and subject to the precondition that the SSP has now gathered the necessary information and has it available, the first SCP ends the transaction with the SSP by instructing the SSP to reanalyze the call that is being processed. The new number analysis leads to a new transaction being set up with the first SCP. However, since the necessary information is now available, the first SCP does not need to ask any further questions of the SSP and can pass on the message, after any necessary treatment, by means of a transfer to the second SCP. Although the setting up of this second transaction also requires time, it is worthwhile if a sufficient number of additional messages need to be interchanged between the second SCP and the SSP. However, fewer memory resources are required in the first SCP, in order to administer transactions and application relays.

In another embodiment of the invention, there is a method in which an SCP is used when the time and processor power saved as a result of the avoidance of application relays makes the complexity for setting up a new transaction worthwhile.

In another embodiment, once the first transaction has ended, the first SCP passes to the SSP additional information which the latter then mirrors when setting up the second transaction with the first SCP. The first SCP can use this information to speed up the processing of the second transaction.

In a third embodiment, once the first transaction has ended, the first SCP can pass to the SSP additional information (for example a modified telephone number) which results in the SSP setting up the second transaction directly with the second SCP. However, it is preferable for the SSP to have appropriate trigger tables.

In a fourth embodiment, a method of the invention is used in an SCP when the current load on the SCP makes it appear to be advisable to load the SCP as little as possible and a second transaction, which can be carried out by means of a transfer, requires less complexity and/or resources than continuation of the current transaction by means of application relays.

An exemplary embodiment of the invention will now be described with reference to service telephone number portability. In this case, before the actual service logic in an SCP is triggered for IN calls, a service telephone number transportability server (DRN server) is checked to determine whether the corresponding service telephone number (DRN) has been ported. If porting has taken place, the call can be passed on to the new SCP of an external network operator. If the DRN has not been ported, the previous SCP of the network operator can process the IN call. The first SCP is in this case the DRN portability server, and the second SCP is the previous SCP of the network operator (situation: DRN not ported).

Figure 1:
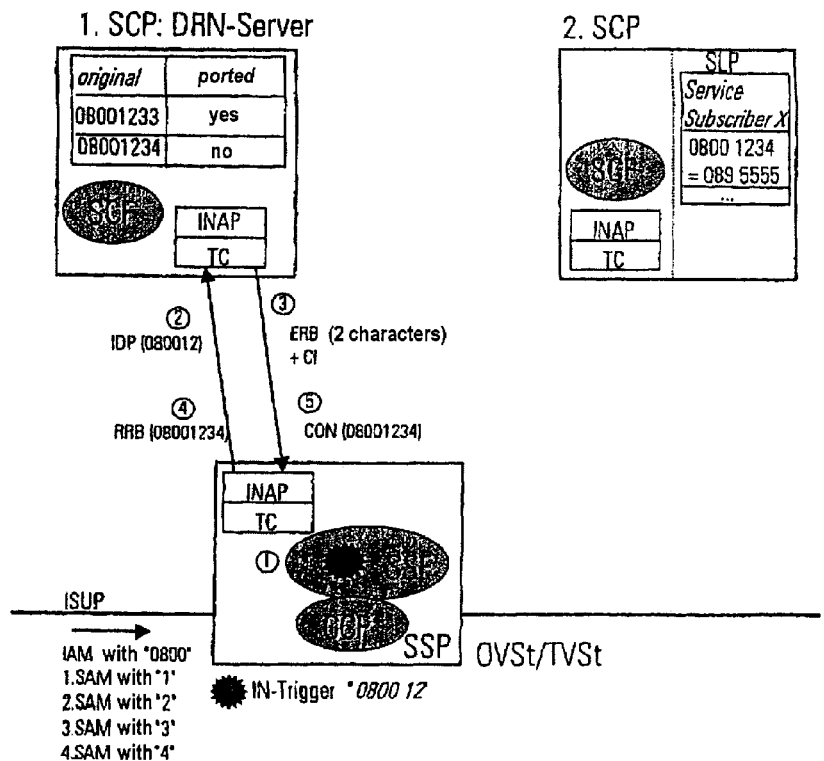
FIG. 1 illustrates the first embodiment of the invention.
Figure 2:
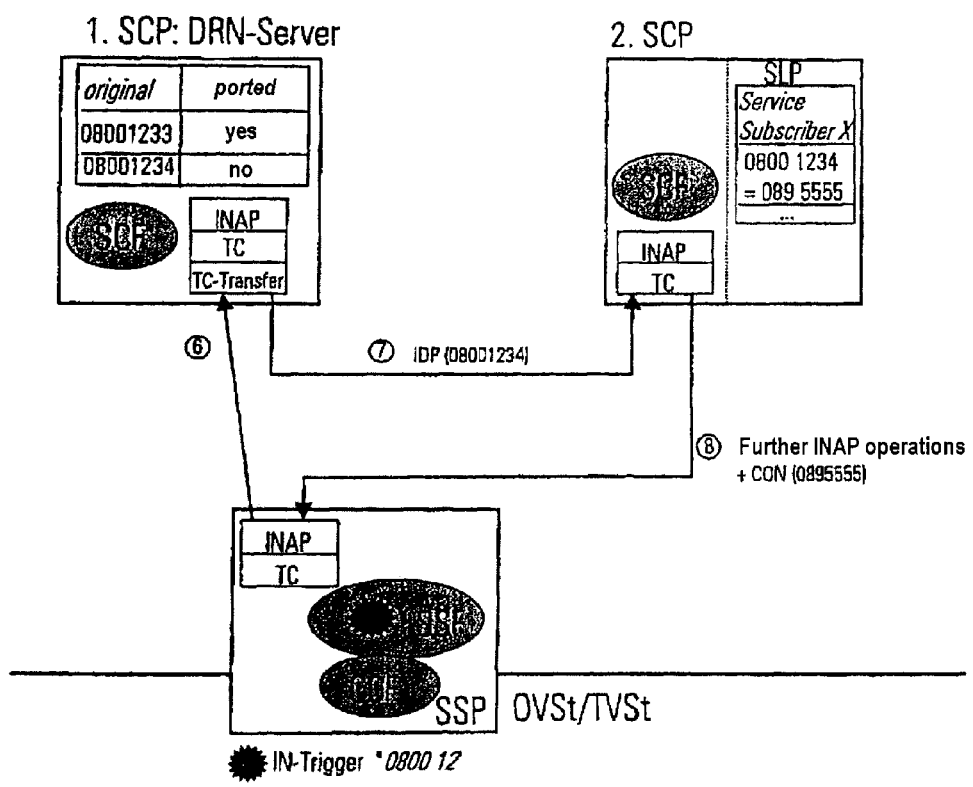
FIG. 2 illustrates the second embodiment of the invention.

The following scenarios, as shown in FIGS. 1 and 2, are intended to illustrate the sequence. Described below are exemplary responses according to the invention for the two embodiments.

1. IN trigger to the selected DNR, trigger criterion= 080012
2. In the event of a trigger, an INAP message is sent generally to the DRN server (first SCP) (INAP: InitialDP/ IDP*)
3. On the basis of the Called Party Number=080012 that is also supplied, the service logic cannot identify whether a DNR has been ported, and sends a request to the SSP to send back two further characters (INAP: RequestReportBCSM/RRB+CollectInfo/CI*)
4. SSP sends the characters that have been requested back to the DRN server (INAP: EventReportBCSM/ERB*)
5. DRN server identifies that DRN=08001234 has not been ported and transfers to the SSP the complete DRN for further treatment (INAP: Connect/CON*). This transfer ends the INAP dialog between the DRN_Server and the SSP.
6. The SSP carries out a character analysis of the DNR received via the INAP and once again identifies the IN trigger described in 1. From the SSP point of view, this is a completely new trigger, that is to say there is no longer any correlation with the previous trigger to the same DRN. Another INAP dialog is opened with the DNR server on the basis of the trigger data provided.
7. On the basis of the Called Party Number=08001234 which is now complete, the service logic can identify the fact that the DNR has not been ported, and carries out a transfer (TC transfer) of the INAP message to the second SCP, containing the service logic for the DNR.
8. The second SCP continues the INAP dialog with the SSP in accordance with the service logic. The first SCP is no longer involved in the communication.

Note: See, for example, Q.1218 for INAP operations.

DESCRIPTION

Method for Driving Servers
1. What technical problem is your invention intended to solve?
2. How has this problem been solved in the past?
3. In what way does your invention solve the stated technical problem (describe the advantages)?
4. Exemplary embodiment or embodiments of the invention.

Re 1. An essential characteristic of so-called intelligent networks (see the Q.1200 series of ITU-T Recommendations) is a distributed architecture (see, for example Q.1214) in which a so-called service switching function (SSF) is "controlled" by a so-called service control function (SCF), with these two functions normally (not necessarily) being provided in different physical nodes (the so-called service control point, SCP and the service switching point, SSP). The so-called INAP (Intelligent Network Application Part) protocol, which is based on TC (Transaction Capabilities, see Q.77x), SCCP (Q.71x) MTP (Q.70x) is used for communication in this case.

Applications are now feasible in which an SCP starts the processing of a transaction, but the processing is then intended to be continued on another SCP. The way in which this may be continued in cases in which this is possible in accordance with the protocol is described in the present invention.

Re 2. The standards do not provide any solution for this continuation of transaction processing. A so-called transfer is feasible, in which the message opening the transaction is passed on to the next SCP after initial treatment. In this case, the logical sender of this message is not changed, so that, for the next SCP, it appears as if the message had arrived directly from an SSP. The SCP can then respond directly to the SSP, so that any further messages for this transaction can be interchanged directly between the SSP and the new SCP.

However, if it is necessary for the first SCP to interchange further messages with the SSP, then this transfer is no longer possible. One situation in which such a further message interchange is necessary is that where the first message did not at that stage contain sufficient address information (for example dialed digits) in order to define the second SCP responsible for the further processing.

Since, specifically with the first return message which it receives for the transaction, the SSP stores the address of the message sender, including the identification used by the sender for that transaction, and uses this information for all future messages to be transmitted for this transaction, the SSP will send all further messages to the first SCP even if the latter has in the meantime transferred the processing to the second SCP.

Thus, in this case, the first SCP is still included in the communication between the SSP and the second SCP. This is because, instead of a transfer, the first SCP must open its own transaction with the second SCP and must remain as a communication distributor in the dialog between the SSP and the second SCP. For this purpose, the first SCP must process the messages to be interchanged between the second SCP and the SSP such that it replaces the addresses and the transaction identification of the second and first SCPs for messages which are sent from the second SCP to the first SCP, by those for the transaction between the first SCP and the SSP, and passes on the amended messages to the SSP.

Conversely, messages from the SSP are processed in the first SCP such that the addresses and transaction identifications of the SSP and first SCP are replaced by those applicable to the transaction between the first SCP and the second SCP, and the amended messages are passed on to the second SCP. This is referred to as an application relay, which is carried out by the first SCP. As can be seen immediately, this solution has the disadvantage that, even though it does not have to carry out any additional tasks for the transaction or transactions, other than the relaying process, the first SCP is still included in the communication process and, except for the TC protocol level, has to analyze and amend the messages. This wastes not only time but also processor and memory resources.

Re 3. According to the invention, this disadvantage described above relating to the necessity for the application relay is avoided in that, once the communication has taken place with the SSP and subject to the precondition that the SSP has now gathered all the necessary information and has it available, the first SCP ends the transaction with the SSP by instructing the SSP to reanalyze the call that is being processed. This new number analysis leads to a new transaction being set up with the first SCP. However, since all the necessary information is now available, the first SCP does not need to ask any further questions of the SSP and can pass on the message, after any necessary treatment, by means of a transfer to the second SCP. Although the setting up of this second transaction also requires time, this is more than worthwhile, however, if a sufficient number of additional messages need to be interchanged between the second SCP and the SSP. However, fewer memory resources are required in the first SCP in any case, in order to administer transactions and application relays.

The invention thus uses means which comply with the standard in order to solve a problem which is not addressed by the standard.

The method according to the invention is thus used as an advantageous embodiment in an SCP only when it can be said that the time and processor power saving resulting from the avoidance of application relays makes the complexity for setting up a new transaction worthwhile.

In a second embodiment, once the first transaction has ended, the first SCP passes to the SSP additional information which the latter then mirrors when setting up the second transaction with the first SCP. The first SCP can use this information to speed up the processing of the second transaction.

In a third embodiment, once the first transaction has ended, the first SCP can pass to the SSP additional information (for example a modified telephone number) which results in the SSP setting up the second transaction directly with the second SCP. However, to do this, it is necessary for the SSP to have appropriate trigger tables and, in some circumstances, this is not always guaranteed.

In a fourth embodiment, the method according to the invention is used in an SCP only when the current load on the SCP makes it appear to be advisable to load the SCP as little as possible and a second transaction, which can be carried out by means of a transfer, requires less complexity and/or resources than continuation of the current transaction by means of application relays.

Re 4. We consider the case of service telephone number portability as an exemplary embodiment of the invention. In this case, before the actual service logic in an SCP is triggered for IN calls, a service telephone number transportability server (DRN server) is checked to determine whether or not the corresponding service telephone number (DRN) has been ported. If porting has taken place, the call can be passed on to the new SCP of an external network operator. If the DRN has not been ported, the previous SCP of the network operator can process the IN call. According to the description in 3., the first SCP is in this case the DRN portability server, and the second SCP is the previous SCP of the network operator (situation: DRN not ported).

The following scenarios (see FIGS. 1 and 2 as well as the subsequent description relating to them) is intended to illustrate the sequence. This describes the response according to the invention for the first and second embodiments.

1. IN trigger to the selected DNR, trigger criterion= 080012
2. In the event of a trigger, an INAP message is sent generally to the DRN server (first SCP) (INAP: InitialDP/ IDP*)
3. On the basis of the Called Party Number=080012 that is also supplied, the service logic cannot identify whether a DNR has been ported, and sends a request to the SSP to send back two further characters (INAP: RequestReportBCSM/RRB+CollectInfo/CI*)
4. SSP sends the characters that have been requested back to the DRN server (INAP: EventReportBCSM/ERB*)
5. DRN server identifies that DRN=08001234 has not been ported and transfers to the SSP the complete DRN for further treatment (INAP: Connect/CON*). This transfer ends the INAP dialog between the DRN_Server and the SSP.
6. The SSP carries out a character analysis of the DNR received via the INAP and once again identifies the IN trigger described in 1. From the SSP point of view, this is a completely new trigger, that is to say there is no longer any correlation with the previous trigger to the same DRN. Another INAP dialog is opened with the DNR server on the basis of the trigger data provided.
7. On the basis of the Called Party Number=08001234 which is now complete, the service logic can identify the fact that the DNR has not been ported, and carries out a transfer (TC transfer) of the INAP message to the second SCP, containing the service logic for the DNR.
8. The second SCP continues the INAP dialog with the SSP in accordance with the service logic. The first SCP is no longer involved in the communication.

Note: See, for example, Q.1218 for INAP operations.

What is claimed is:

1. A method for controlling services in a communications network, comprising:

communicating with a first server initiated by a network node in the communications network to assist processing of a service;

ending the communication by the first server when the first server and the network node have gathered information which is required for selection of a second server, the second server assisting in processing of the service, and which can be transmitted by using a single message to one of the servers; and instructing the network node to start a second communication with the first server to assist the processing of the service, with the information required for selection of the second server packed into the first message in the second communication, wherein the first message is processed by the first server, and information relating to acceptance of the second communication is passed to the second server, and the second communication is continued by the second server.

2. The method as claimed in claim 1, wherein when the first communication is ended by the first server, additional information is passed to the network node and is mirrored in the second communication to the first server.

3. The method as claimed in claim 1, wherein when the first communication is ended by the first server, information is passed to the network node, and the second communication is set up directly to the second server.

4. The method as claimed in claim 1, wherein the communication between the network nodes and the servers is carried out using an INAP protocol.

5. The method as claimed in claim 2, wherein when the first communication is ended by the first server, information is passed to the network node, and the second communication is set up directly to the second server.

6. The method as claimed in claim 2, wherein the communication between the network nodes and the servers is carried out using an INAP protocol.

7. The method as claimed in claim 3, wherein the communication between the network nodes and the servers is carried out using an INAP protocol.

* * * * *